July 15, 1924.

E. V. MYERS

DUST CAP

Filed Dec. 19, 1919

1,501,362

INVENTOR
Eugene V. Myers,
By Attorneys,

Patented July 15, 1924.

1,501,362

UNITED STATES PATENT OFFICE.

EUGENE V. MYERS, OF EAST ORANGE, NEW JERSEY, ASSIGNOR TO A. SCHRADER'S SON, INCORPORATED, OF BROOKLYN, NEW YORK, A CORPORATION OF NEW YORK.

DUST CAP.

Application filed December 19, 1919. Serial No. 345,995.

*To all whom it may concern:*

Be it known that I, EUGENE V. MYERS, a citizen of the United States of America, residing in East Orange, in the county of Essex and State of New Jersey, have invented certain new and useful Improvements in Dust Caps, of which the following is a specification.

This invention relates to dust caps or the like, and aims to provide certain improvements therein.

The invention is particularly directed to a dust cap or other device which it is desired to clamp upon a tire valve or other structure. In a prior application filed by H. P. Kraft, Serial No. 325,097, there is shown and described a quick acting dust cap which comprises essentially a cap portion and a foot portion, together with a more or less ring-shaped clamping member which is adapted to be contracted circumferentially to clamp the tire valve. According to the present invention I provide a cap of this type in which the clamping member is of the same or similar construction, and in which the foot portion is arranged within or substantially within the cap portion instead of being arranged outside the same as in the structure of said application. By this means the cap portion constitutes preferably the entire exterior of the device, there being no movable joints between the cap portion and foot portion that are accessible from the exterior, or in other words, in the preferred form the cap portion when in place constitutes the entire covering or enclosing device of the tire valve or similar article.

In the drawing, wherein I have shown several forms of the invention,—

Figure 1:
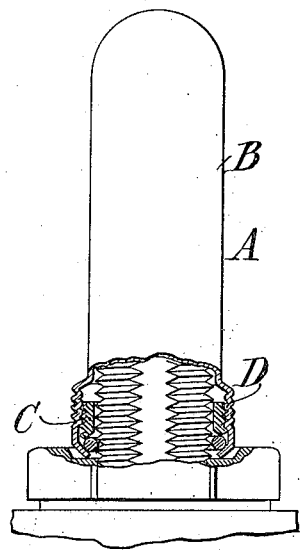
Figure 1 is an elevation of the cap, partly in section, showing the latter in place upon the tire valve.
Figure 2:
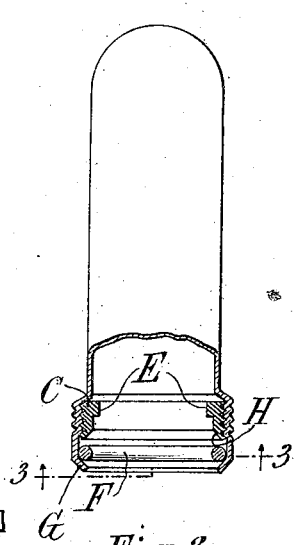
Fig. 2 is a similar view of the cap taken at right angles to Fig. 1.
Figure 3:
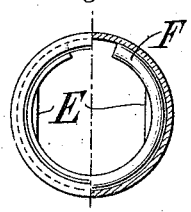
Fig. 3 is a sectional view on the line 3—3 in Fig. 2.

Referring first to Figs. 1 to 3 of the drawings, let A indicate the cap as a whole which comprises a cap portion B and a foot portion C. It will be observed that the cap portion has a lower left-hand screw-threaded part D, the interior thread of which is in threaded engagement with the foot portion C. The foot portion which is herein shown as a short tubular member or sleeve is provided with flats E or other means for engaging the flat sides of the pneumatic tire valve. Hence it will be observed that when the cap is fitted over a tire valve with the foot portion in engagement therewith, a rotative movement of the cap portion B in a clockwise direction relatively to the foot portion C will produce a downward movement of the foot portion relatively to the cap portion.

The clamping device illustrated is a ring-shaped structure shown as a split ring F which lies on a flange G formed on the cap portion, which flange is preferably tapered. The foot portion preferably has a similar taper H which when the foot portion is moved downwardly contracts the ring circumferentially into engagement with the threaded exterior of the tire valve. It is obvious that the tapered surface on one of these parts may be omitted. The split ring F is preferably substantially non-compressible, that is to say, its holding engagement with the exterior of the tire valve is brought about by circumferentially contracting the ring into clamping engagement therewith instead of accomplishing such holding engagement through the inherent elasticity or compressibility of the spring ring.

Figure 4:
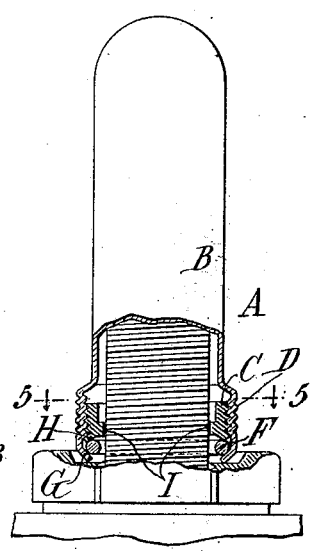
Fig. 4 is a view similar to that disclosed in Fig. 1 of a slightly modified form.
Figure 5:
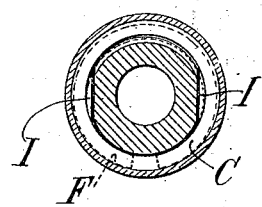
Fig. 5 is a sectional view on the line 5—5 of Fig. 4.

In Figs. 4 and 5 the construction is similar to that of Figs. 1 to 3, with the exception that the flat surfaces on the foot portion indicated by the reference letter I are made at the lower end of the foot portion instead of at the upper end, as in Figs. 1 to 3. Otherwise the constructions are practically identical.

The invention may be applied to other devices than dust caps where it is desired to clamp a member to a projecting part, such as a tire valve or analogous member.

While I have shown and described one form of the invention, it will be understood that I do not wish to be limited thereto, since various changes can be made therein without departing from the spirit of the invention.

What I claim is:—

1. In a dust cap or the like, the combination of a cap portion and a foot portion arranged within the cap portion having a non-rotative engagement with a tire valve or the like and capable of relative axial movement, and a substantially non-compressible clamping device of circular form and normally of larger diameter than the tire valve, positioned between said cap portion and foot portion, and adapted to be moved into clamping position by engagement with means on said portions brought about by a relative axial movement of said portions.

2. In a dust cap or the like, the combination of a cap portion and a foot portion arranged within the cap portion having a non-rotative engagement with a tire valve or the like and capable of relative axial movement, and a clamping device comprising a split ring normally of larger diameter than the tire valve, positioned between said cap portion and foot portion, and adapted to be moved into clamping position by engagement with means on said portions brought about by a relative axial movement of said portions.

3. In a dust cap or the like, the combination of a cap portion and a foot portion, the foot portion being exteriorly screw-threaded and engaging the interior of the cap portion and capable of relative axial movement therewith, and a substantially non-compressible clamping member positioned between the cap portion and the foot portion and actuated by engagement with means on said portions brought about by a relative axial movement of said portions, through the medium of the screw-threaded connection between said portions, to decrease its normal diameter, and the foot portion having flats adapted to engage the flats of a tire valve or the like to prevent its rotation.

4. In a dust cap or the like, the combination of a cap portion having a flange at its lower end, a ring-shaped clamping member adapted to have its normal diameter decreased resting on said flange, a foot portion within said cap portion above said clamping member and capable of engagement with said clamping member through a relative axial movement of the cap portion and foot portion, said foot portion having a threaded engagement with said cap portion and having means for preventing its rotation upon a tire valve, whereby the cap may be adjusted upon a tire valve and clamped in place by rotation of said cap portion, which produces a relative axial movement between said cap portion and foot portion.

5. In a dust cap or the like, the combination of a cap portion having its open end formed with an inwardly directed bevelled flange, a foot portion threadedly mounted within the cap portion above said flange, and a ring shaped clamping member between said bevelled flange and foot portion adapted to have its normal diameter decreased by a relative rotary movement of the cap portion and foot portion, which produces a relative axial movement between said parts.

6. In a dust cap or the like, the combination of a cap portion and a foot portion, the foot portion being arranged within the cap portion and capable of relative axial movement, and a substantially non-compressible clamping device of circular form positioned between said cap portion and foot portion and adapted to be forced into clamping engagement with a threaded member by engagement with means on said portions brought by a relative rotary movement of the cap portion and foot portion, which produces a relative axial movement between said parts.

7. In a dust cap or the like, the combination of a cap portion and a foot portion, the foot portion being arranged within the cap portion and capable of relative axial movement, and a clamping device, comprising a split ring positioned between said cap portion and foot portion and adapted to be forced into clamping engagement with a threaded member by engagement with means on said portions brought about by a relatively rotary movement of the cap portion and foot portion, which produces a relative axial movement between said parts.

8. In a dust cap or the like, the combination of a cap portion, an internal sleeve, a non-compressible clamping means, and a wedging means, said sleeve and cap portion being threaded together, and the clamping means being forced against said wedging means by relative rotary movement of the sleeve and cap portion to positively contract said clamping means into binding engagement with a valve stem or the like.

9. In a dust cap or the like, the combination of a cap portion, an internal sleeve substantially entirely enclosed within said cap portion, and a clamping means positively moved into engagement with a valve stem or the like by a relatively rotary movement of said internal sleeve and said cap portion, the sleeve and cap portion being provided with means for longitudinally moving the sleeve on such relative rotation, and such means being located above the clamping means.

10. In a dust cap or the like adapted to fit over a valve stem, the combination of a cap portion, an internal sleeve provided with means for preventing its rotation when applied over the valve stem, and a non-compressible clamping means adapted to be positively moved into engagement with the valve stem to hold the cap at any point on the exposed portion thereof, through a relative rotary movement of the cap and sleeve which produces a relative axial movement therebetween.

In witness whereof, I have hereunto signed my name.

EUGENE V. MYERS.